US006925979B1

(12) United States Patent
Seitz

(10) Patent No.: US 6,925,979 B1
(45) Date of Patent: Aug. 9, 2005

(54) METHOD OF OPERATING A MULTICYLINDER INTERNAL COMBUSTION ENGINE

(75) Inventor: Hans Felix Seitz, Graz (AT)

(73) Assignee: AVL List GmbH, Graz (AT)

( * ) Notice: Subject to any disclaimer, the term of this patent is extended or adjusted under 35 U.S.C. 154(b) by 121 days.

(21) Appl. No.: 10/627,814

(22) Filed: Jul. 28, 2003

(30) Foreign Application Priority Data

Jul. 26, 2002 (AT) .............................. GM504/2002

(51) Int. Cl.⁷ .......................................... F02N 17/08
(52) U.S. Cl. .............................................. 123/179.18
(58) Field of Search ....................... 123/179.18, 179.21

(56) References Cited

U.S. PATENT DOCUMENTS 3,659,415 A * 5/1972 Brenneke ............... 123/179.18
3,783,610 A    1/1974 Gano

FOREIGN PATENT DOCUMENTS

| AT | 004963 | 1/2002 |
|----|--------|--------|
| CH | 662393 | 9/1987 |
| DE | 2502650 | 7/1976 |
| DE | 2648411 | 4/1978 |
| DE | 2847527 | 5/1980 |
| DE | 19831251 | 1/2000 |
| EP | 0579590 | 1/1994 |
| GB | 1480247 | 7/1977 |

* cited by examiner

Primary Examiner—Andrew M. Dolinar
(74) Attorney, Agent, or Firm—Dykema Gossett PLLC

(57) ABSTRACT

A method for the operation of a multi-cylinder internal combustion engine with intake and exhaust valves and at least one braking valve for each cylinder, the braking valves being connected to a common pressure vessel (braking rail), wherein during the start-up phase of the internal combustion engine a first group of cylinders is cut off from the fuel supply such that the cylinders of this first group operate as compressors which charge the pressure vessel via their braking valves with compressed air, and the cylinders of a second group of cylinders which are supplied with fuel are charged with compressed air from the pressure vessel via their braking valves, such that the compression pressure and compression temperature in the cylinders of the second group is raised during the start-up phase.

5 Claims, 4 Drawing Sheets

METHOD OF OPERATING A MULTICYLINDER INTERNAL COMBUSTION ENGINE

The invention relates to a method for the operation of a multi-cylinder internal combustion engine with intake and exhaust valves and one or more braking valves for each cylinder, said braking valves being connected to a common pressure vessel (braking rail).

From AT 4.963 U1 a multi-cylinder internal combustion engine is known, which in addition to the intake and exhaust valves has a braking valve for each cylinder. All braking valves of the engine open into a common tubular pressure vessel, thus permitting gas exchange between the individual engine cylinders when the braking valves are actuated. The tubular pressure vessel is provided with a pressure control valve, which is acted on by control signals derived from the position of a brake switch or brake pedal.

From DE 26 48 411 A1 an exhaust-charged, low-compression, self-igniting internal combustion engine is known, in which during start-up or under partial-load conditions at least one cylinder is operated as motor cylinder, which is charged by another cylinder operated as a compressor. The piston of the compressor cylinder leads the piston of the motor cylinder to such an extent that the motor cylinder may be charged by the compressor cylinder directly via a connecting line. The charge of the motor cylinder resulting from this arrangement is limited, however.

In CH 662 393 A5 an improvement of the device according to DE 26 48 411 A1 is proposed which provides that the motor cylinder is charged by at least one additional compression cylinder besides the first compression cylinder. In this proposal a compression cylinder, which due to the large ignition interval relative to the motor cylinder cannot directly feed into the motor cylinder, feeds into another compression cylinder instead, which is better placed in relation to the motor cylinder. The charge air from both compression cylinders is then fed into the motor cylinder.

From GB 1 480 247 A an internal combustion engine is known, which is designed in such a way that all or a multitude of cylinders may be operated as air compressors. The engine is furnished with two different transmission means between crankshaft and two overhead camshafts, which may be activated or deactivated by electromagnetic couplings, thus permitting the engine to be operated either as motor or as compressor with appropriate valve timings of the intake and exhaust valves.

It is the object of the present invention to propose a method for the operation of a multi-cylinder internal combustion engine as initially described, which leads to an improvement of the cold-start characteristics of the engine.

According to the invention this object is achieved by providing that during the start-up phase a first group of cylinders is cut off from the fuel supply such that this first group of cylinders operate as compressors which load the pressure vessel with compressed air via their braking valves, and that the cylinders of a second group of cylinders which are supplied with fuel, are charged with compressed air from the pressure vessel via their braking valves, thus raising the compression pressure and compression temperature in the cylinders of the second group during the start-up phase.

The advantages of the method according to the invention lie primarily in the fact that elements already present in the engine, such as braking rail and braking valves, are utilised and that only control and timing elements of the engine (valve timing, switching off fuel supply for individual cylinders) have to be suitably adjusted, in order to substantially improve the cold start behavior of the engine and to minimize fuel consumption. Furthermore white-smoke emission of the engine during the start-up phase is improved, since the exhaust gas contains less unburned fuel. The internal combustion engine may advantageously be operated at a lower compression ratio (formerly the compression ratio had to be high to improve cold start), which permits peak pressure at full load to be reduced.

Switching-off individual groups of cylinders in supercharged internal combustion engines is in itself a known procedure. An internal combustion engine according to DE 198 31 251 A1 for instance has a first group of cylinders which is active over the entire range of operational states, while a second group of cylinders may be switched on or off as the necessity arises. It is the aim of DE 198 31 251 A1 to optimize the response behavior of the engine when the second group of cylinders is switched on. For this purpose an exhaust gas turbocharger is provided which is used exclusively to charge the first cylinder group while a second mechanical charger is used exclusively for charging the second cylinder group.

An internal combustion engine, which works as a compressor in the start-up phase bringing an exhaust gas turbocharger up to its minimum speed required for engine operation, is known from EP 0 579 590 A1. In the start-up phase the turbocharger is brought up to a given minimum speed with fuel injection switched off, and after the timing sequence has been reset to normal operation and the fuel injection switched on the charger and the internal combustion engine will be optimally matched. Once again, the compressed air is not directly fed from a cylinder of the first group to a cylinder of the second group. Furthermore, braking valves comparable to those used in the present invention are absent.

A particularly advantageous variant of the invention proposes that for the cylinders of the first group the braking valves be opened in the range 540° to 720° crank angle, and preferably 570° to 690° crank angle, to charge the pressure vessel with air, and that for the cylinders of the second group the braking valves be opened in the range 480° to 630° crank angle, preferably 510° to 610° crank angle, to feed compressed charge air from the pressure vessel.

Both groups of cylinders preferably have the same number of cylinders (e.g. in six-, eight-, or twelve-cylinder engines) but it is also possible that the number of cylinders in the first group differs from that in the second group, such that for instance in the case of a five-cylinder engine a ratio of 2:3 or 3:2 is chosen.

According to the invention the multi-cylinder internal combustion engine may be operated from start-up until idling speed is attained exclusively by the cylinders of the second group.

According to a variant of the invention the multi-cylinder internal combustion engine may be operated during a short start-up phase exclusively by the cylinders of the second group.

The invention will now be explained in detail with reference to the attached drawings.

Figure 1:
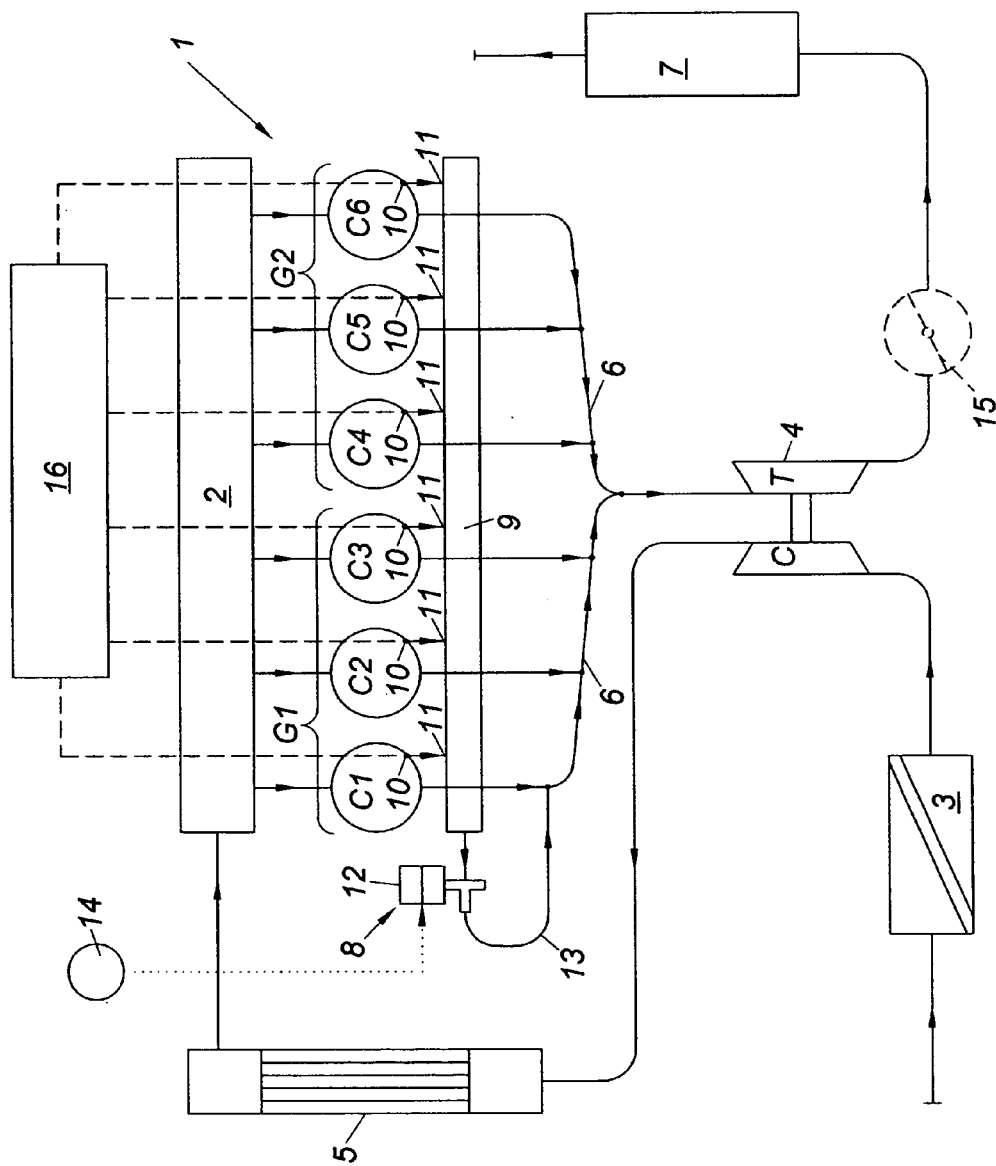
FIG. 1 shows a schematic drawing of an internal combustion engine with a motor braking device suitable for the method of the invention.

In FIG. 1 the method according to the invention is explained for the case of a six-cylinder turbo-charged engine, it being understood that the method is independent of the number of cylinders and may for instance also be used with five-, eight- or twelve-cylinder engines. The method of the invention may also be used with a naturally aspirated engine.

The six cylinders C1 to C6 of the internal combustion engine 1, which are grouped into a first group G1 (e.g. cylinder C1 to C3) and a second group G2 (e.g. cylinder C4 to C6) are connected to an intake manifold 2 via intake ports not shown in detail, which intake manifold 2 is supplied with charge-air coming from the air filter 3 via the compressor component C of the turbo-charger 4 and the intercooler 5. The exhaust valves of the internal combustion engine 1 open into the exhaust system 6, the exhaust gases passing through the turbine component T of the turbocharger 4 and through a silencer 7 in a conventional manner.

The engine braking device 8 comprises a tubular pressure vessel 9 (braking rail) into which open braking ports 11 departing from the braking valves 10, thus permitting gas exchange between the cylinders C1 to C6 at a relatively high pressure level. As regards engine design the pressure vessel 9 may either be integrated directly into the cylinder head of an automotive engine or may be configured as an external connecting pipe similar to an intake or exhaust manifold. The braking valves are preferably actuated electro-hydraulically and the actuation is therefore easily varied.

When the internal combustion engine 1 is in the braking mode the braking valves 10 are actuated a number of times during one working cycle of the engine, for instance two braking strokes per cycle may occur, with the first of these near upper dead center of the high pressure stroke of the engine. During this braking stroke highly compressed air from one of the cylinders C1, C2, C3, C4, C5, or C6 enters the braking rail 9. On the one hand the braking rail 9 is thereby filled with pressurized air (up to 20 bar operating pressure) while on the other hand the expansion work of the cylinder is decreased and braking power is generated. Shortly after the intake valve closes the braking valve 10 opens again causing compressed air from the braking rail 9 to flow into the combustion chamber. Due to the second braking stroke cylinder pressure will rise to the pressure level of the braking rail 9 at the beginning of the compression phase of the high pressure stroke. This will increase the required compression work and thus again the braking power of the engine.

Figure 2:
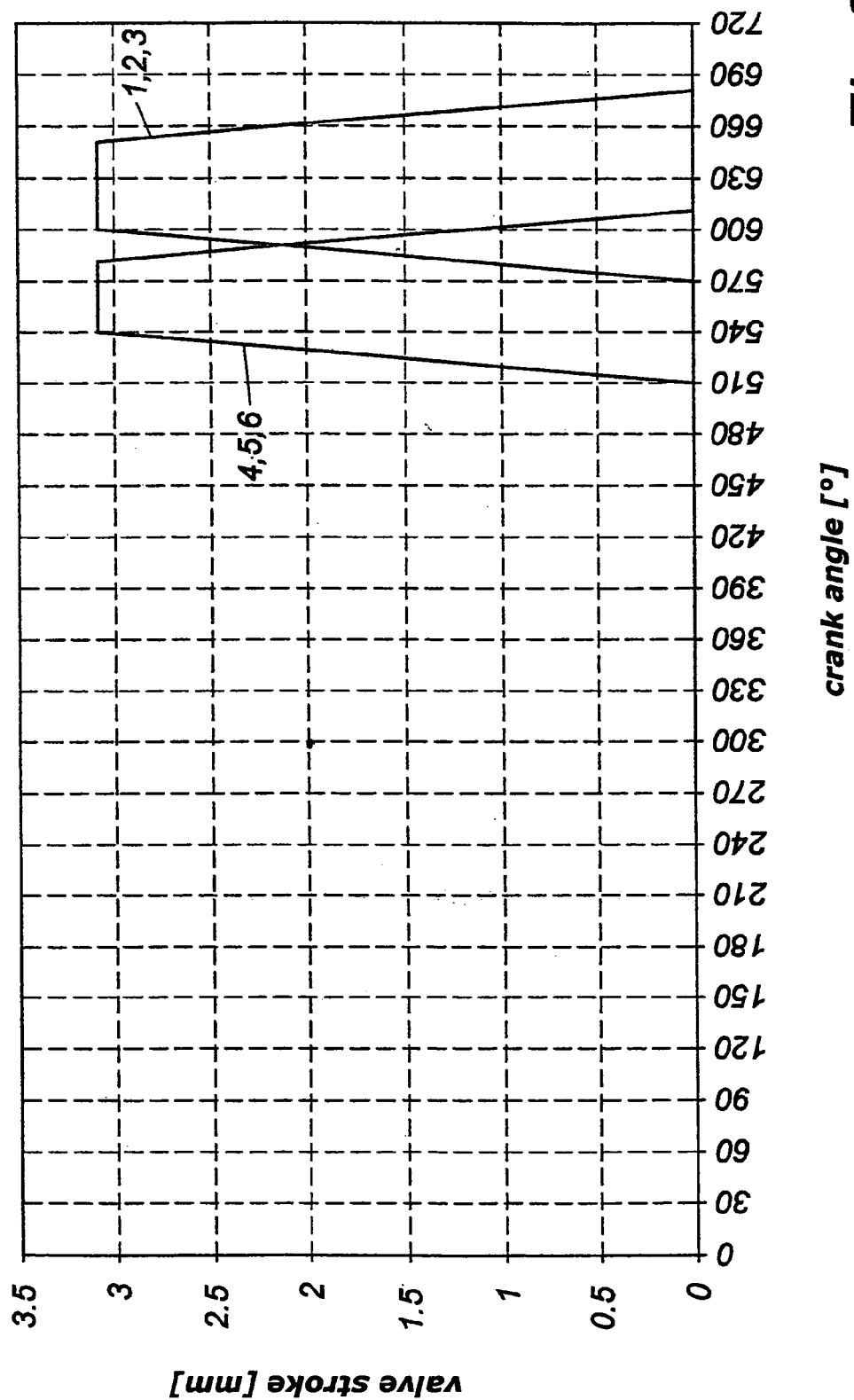
FIG. 2 is a diagram of the valve stroke of the braking valves (unit mm).
Figure 3:
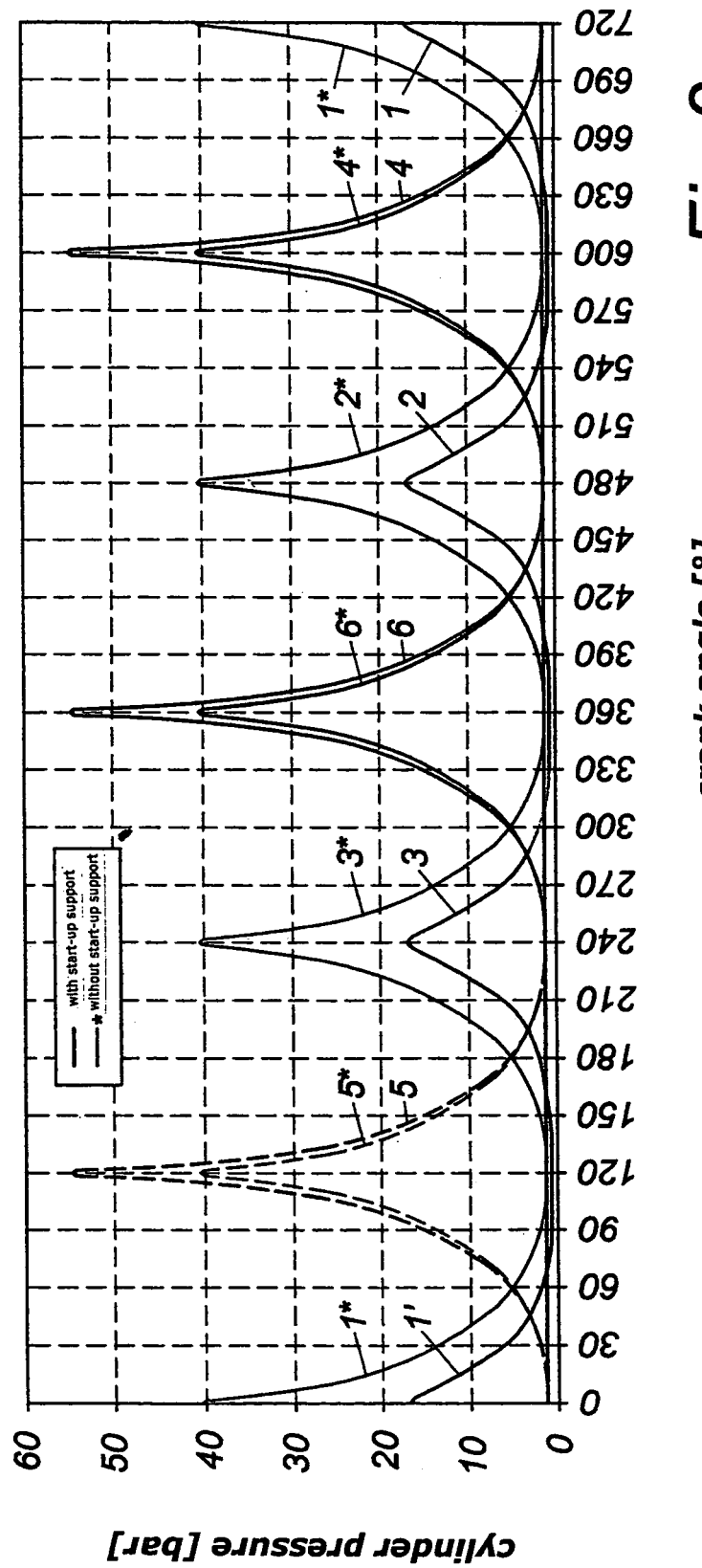
FIG. 3 is a diagram of the cylinder pressure (unit bar).

In order to improve the cold-start characteristics of the engine the electronic control unit 16 will change the valve timings for the braking valves 10 (differing from those during braking operation) as shown in FIG. 2. Two different valve timings are set: some of the cylinders (in the example shown cylinders C1 to C3 of group G1) are used to charge the braking rail 9 with compressed air. During the start and warm-up phase no fuel is injected into these cylinders C1 to C3 and the compression pressure and therefore the compression temperature in these cylinders is low (see FIG. 3).

Figure 4:
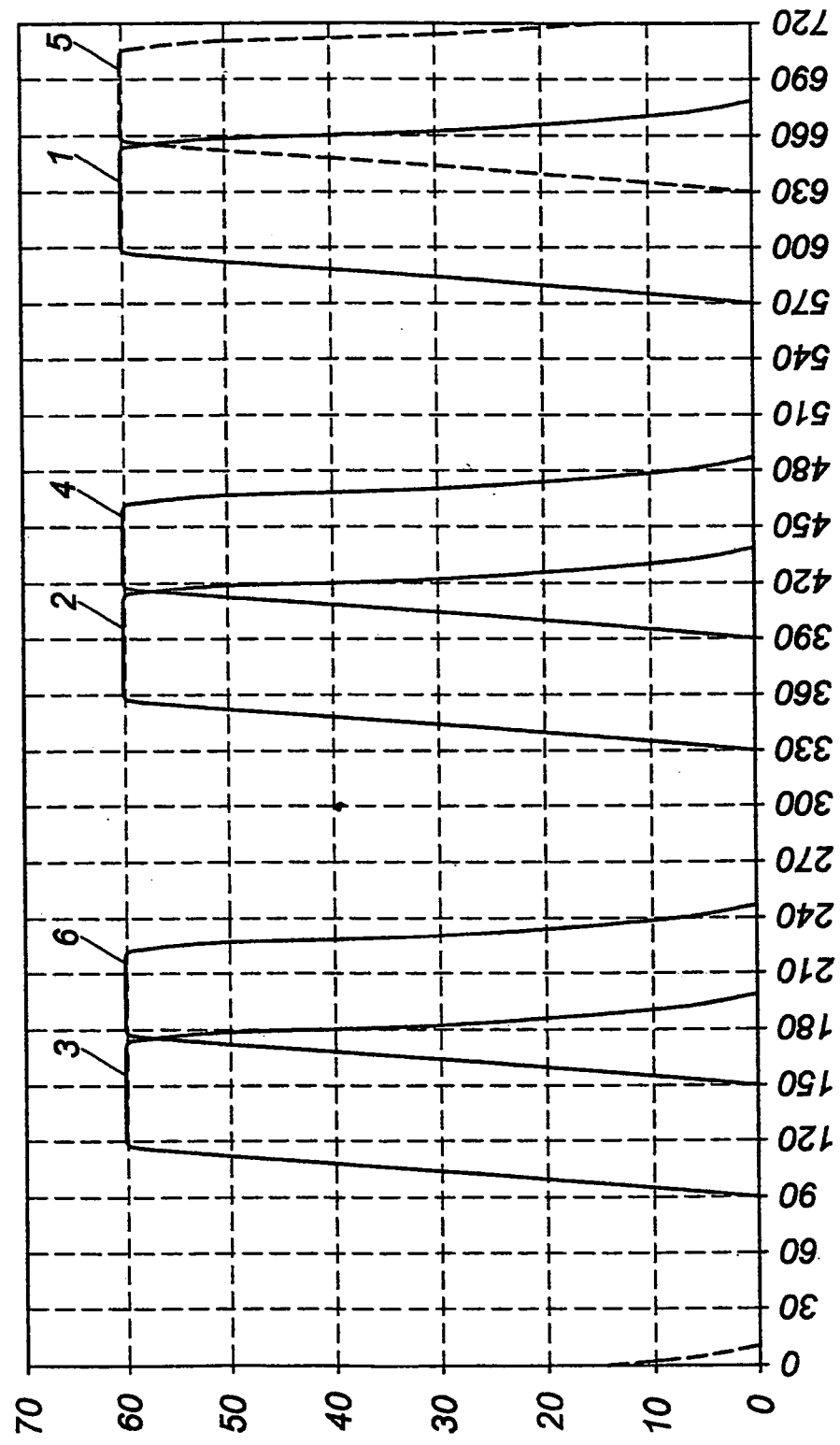
FIG. 4 is a diagram of the effective flow cross-sections of the braking valves (unit $mm^2$) as a function of the crank angle (for a six-cylinder engine during start-up at 150 rpm).

The remaining cylinders (cylinders C4 to C6 of group G2 in the example shown) take compressed air from the braking rail 9 shortly after the normal intake valves have closed (e.g. 540° crank angle), thus cylinder C1 for instance supplies compressed air via the braking rail 9 to cylinder C5 and so on (see FIG. 4). This will significantly increase compression pressure and compression temperature of these cylinders (see FIG. 3) and the injected fuel is reliably ignited. The engine will thus accelerate from starting speed to idling speed only due to the fired cylinders C4 to C6 and may also be operated during a short warm-up phase by means of these cylinders only. Thereafter start-up support is deactivated by changing the valve timings through the electronic control unit 16 and all cylinders C1 to C6 are switched to normal (fired) operation.

An electronically controlled pressure control valve 12 (see FIG. 1) limits the maximum pressure in the braking rail 9 in order to avoid engine damage. The control valve 12 will furthermore give the driver the opportunity to reduce the pressure in the braking rail 9, for instance via a brake switch 14 on the dash-board, by venting pressurized air from the braking rail 9 via a connecting line 13 into the exhaust system 6 and thus adapting the braking power to the given driving situation.

The braking system 8 may also be combined with an exhaust gas sensor flap 15 indicated by dashed lines.

What is claimed is:

1. A method for the operation of a multi-cylinder internal combustion engine with intake and exhaust valves and at least one braking valve for each cylinder, said braking valves being connected to a common pressure vessel (braking rail), wherein during a start-up phase of said internal combustion engine a first group of cylinders is cut off from fuel supply such that said cylinders of said first group operate as compressors charging said pressure vessel via said braking valves with compressed air, and wherein a second group of cylinders supplied with fuel is charged with compressed air from said pressure vessel via said braking valves, thus raising compression pressure and compression temperature in said cylinders of said second group during said start-up phase.

2. A method according to claim 1, wherein for said cylinders of said first group said braking valves are opened in a range of 540° to 720° crank angle to charge said pressure vessel with air, and wherein for said cylinders of said second group said braking valves are opened in a range of 480° to 630° crank angle to feed compressed charge air from said pressure vessel.

3. A method according to claim 1, wherein for said cylinders of said first group said braking valves are opened in a range of 570° to 690° crank angle to charge said pressure vessel with air, and wherein for said cylinders of said second group said braking valves are opened in a range of 510° to 610° crank angle to feed compressed charge air from said pressure vessel.

4. A method according to claim 1, wherein a multi-cylinder internal combustion engine is operated from start-up until idling speed is attained by said cylinders of said second group exclusively.

5. A method according to claim 1, wherein a multi-cylinder internal combustion engine is operated during a short warm-up phase by said cylinders of said second group exclusively.

* * * * *